United States Patent
Hayashita

(10) Patent No.: US 10,865,725 B2
(45) Date of Patent: Dec. 15, 2020

(54) EXHAUST SYSTEM FOR INTERNAL COMBUSTION ENGINE

(71) Applicant: TOYOTA JIDOSHA KABUSHIKI KAISHA, Toyota (JP)

(72) Inventor: Go Hayashita, Chigasaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 190 days.

(21) Appl. No.: 16/111,566

(22) Filed: Aug. 24, 2018

(65) Prior Publication Data
US 2019/0063355 A1 Feb. 28, 2019

(30) Foreign Application Priority Data
Aug. 30, 2017 (JP) ................... 2017-165572

(51) Int. Cl.
| | | |
|---|---|---|
| *F02D 41/14* | (2006.01) | |
| *G01M 15/10* | (2006.01) | |
| *G01N 27/417* | (2006.01) | |
| *F02D 41/24* | (2006.01) | |
| *F02D 41/28* | (2006.01) | |

(52) U.S. Cl.
CPC ..... *F02D 41/1454* (2013.01); *F02D 41/1479* (2013.01); *G01M 15/104* (2013.01); *G01N 27/4175* (2013.01); *F02D 41/2474* (2013.01); *F02D 2041/147* (2013.01); *F02D 2041/1431* (2013.01); *F02D 2041/281* (2013.01)

(58) Field of Classification Search
CPC ............. F02D 41/1454; F02D 41/1479; F02D 41/2474; F02D 2041/1431; F02D 2041/147; F02D 2041/281; G01M 15/104; G01N 27/4175
See application file for complete search history.

(56) References Cited

U.S. PATENT DOCUMENTS

| | | | |
|---|---|---|---|
| 6,220,017 B1 | 4/2001 | Tayama et al. | |
| 10,019,854 B1 * | 7/2018 | McQuillen | ............... F02D 41/18 |
| 10,202,909 B2 * | 2/2019 | Okazaki | ............... F02D 13/0226 |
| 2009/0173630 A1 * | 7/2009 | Mori | ..................... G01N 27/407 204/424 |
| 2017/0002761 A1 * | 1/2017 | Dudar | ..................... F02M 25/06 |

FOREIGN PATENT DOCUMENTS

| | | |
|---|---|---|
| JP | 2000-008920 | 1/2000 |
| JP | 2011-247093 | 12/2011 |
| JP | 2013-185512 | 9/2013 |

* cited by examiner

*Primary Examiner* — Suman K Nath
(74) *Attorney, Agent, or Firm* — Finnegan, Henderson, Farabow, Garrett & Dunner, LLP

(57) ABSTRACT

An object is to reduce the influence of a hydrogen-ascribable difference between the measurement value of an oxygen sensor and the actual value. An exhaust system includes an oxygen sensor configured to measure the air-fuel ratio of exhaust gas provided in an exhaust passage of an internal combustion engine and including a diffusion rate limiting layer and a controller configured to correct the measurement value of the oxygen sensor in such a way as to increase the measurement value of the oxygen sensor by an amount of correction that is made larger when the responsivity of the oxygen sensor to changes in the air-fuel ratio of the internal combustion engine is high than when it is low in the same operation state of the internal combustion engine.

8 Claims, 6 Drawing Sheets

| TIME CONSTANT (ms) \ HYDROGEN CONCENTRATION(%) | 0 | 0.2 | 0.4 | 0.6 | 0.8 | 1.0 | 1.2 | 1.4 |
|---|---|---|---|---|---|---|---|---|
| 800 | 1.0 | 1.05 | 1.10 | 1.15 | 1.20 | 1.25 | 1.30 | 1.35 |
| 700 | 1.0 | 1.10 | 1.15 | 1.20 | 1.25 | 1.30 | 1.35 | 1.40 |
| 600 | 1.0 | 1.15 | 1.20 | 1.25 | 1.30 | 1.35 | 1.40 | 1.45 |
| 500 | 1.0 | 1.20 | 1.25 | 1.30 | 1.35 | 1.40 | 1.45 | 1.50 |

EXHAUST SYSTEM FOR INTERNAL COMBUSTION ENGINE

CROSS REFERENCE TO RELATED APPLICATIONS

This application claims priority to Japanese Patent Application No. 2017-165572 filed on Aug. 30, 2017 the entire contents of which are incorporated by reference herein.

TECHNICAL FIELD

The present disclosure relates to an exhaust system for an internal combustion engine.

BACKGROUND ART

Carbon monoxide (CO) and hydrocarbons (HC) contained in exhaust gas of internal combustion engines may react with water ($H_2O$) to produce hydrogen ($H_2$). As is known in the art, hydrogen thus produced affects an oxygen sensor, leading to a difference between the value of the air-fuel ratio measured by the oxygen sensor (which will be hereinafter referred to as the measured air-fuel ratio) and the actual air-fuel ratio. As a countermeasure to this, it is known in prior art to correct the measured air-fuel ratio or the responsivity of the sensor output on the basis of the hydrogen concentration in the exhaust gas (see, for example, Patent Literatures 1 to 3 below).

CITATION LIST

Patent Literature

Patent Literature 1: Japanese Patent Application Laid-Open No. 2000-008920
Patent Literature 2: Japanese Patent Application Laid-Open No. 2011-247093
Patent Literature 3: Japanese Patent Application Laid-Open No. 2013-185512

SUMMARY

Technical Problem

Even in cases where a correction based on the hydrogen concentration in the exhaust gas is made to the measured air-fuel ratio, a difference between the measured air-fuel ratio and the actual air-fuel ratio ascribable to hydrogen may still remain. In other words, even if the hydrogen concentration in the exhaust gas is measured accurately and the measured air-fuel ratio is corrected on the basis of the hydrogen concentration, it is difficult to eliminate the difference between the measured air-fuel ratio and the actual air-fuel ratio ascribable to hydrogen.

The present disclosure has been made in view of the above problem, and an object of the present disclosure is to reduce the influence of the hydrogen-ascribable difference between the measurement value of the oxygen sensor and the actual value.

Solution to Problem

According to one aspect of the present disclosure, there is provided an exhaust system for an internal combustion engine comprising an oxygen sensor configured to measure the air-fuel ratio of exhaust gas provided in an exhaust passage of an internal combustion engine and including a diffusion rate limiting layer, and a controller configured to correct the measurement value of said oxygen sensor in such a way as to increase the measurement value of said oxygen sensor by an amount of correction that is made larger when the responsivity of said oxygen sensor to changes in the air-fuel ratio of said internal combustion engine is high than when it is low in the same operation state of said internal combustion engine.

The air-fuel ratio measured by an oxygen sensor varies depending on the hydrogen concentration in the exhaust gas even if the actual air-fuel ratio is the same. It was discovered that the susceptibility of an oxygen sensor to the effect of hydrogen changes depending on the responsivity of the oxygen sensor. The responsivity of an oxygen sensor is a value indicating how fast the measurement value of the oxygen sensor changes after a change in the actual air-fuel ratio. Since the molecular weight of hydrogen is smaller than the other molecules, such as oxygen, contained in the exhaust gas, hydrogen has higher diffusion speed in the diffusion rate limiting layer in the oxygen sensor and travels through the diffusion rate limiting layer more easily. Hence, as the exhaust gas passes through the diffusion rate limiting layer, the decrease in the quantity of hydrogen is smaller than the decrease in the quantity of the other molecules. Consequently, as the exhaust gas passes through the diffusion rate limiting layer, the hydrogen concentration relative to the concentration of the other molecules becomes higher. When the responsivity of the oxygen sensor is higher, hydrogen passes through the diffusion rate limiting layer more easily. Hence, the oxygen sensor is more apt to be affected by hydrogen when the responsivity of the oxygen sensor is high than when it is low, and the measured air-fuel ratio decreases by a larger amount. Therefore, the amount of correction by which the measurement value of the oxygen sensor is increased is made larger when the responsivity of the oxygen sensor is high than when it is low in the same operation state of the internal combustion engine. This can make the measured air-fuel ratio closer to the actual air-fuel ratio. Thus, the influence of the hydrogen-ascribable difference between the measurement value of an oxygen sensor and the actual value is reduced.

According to another aspect of the present disclosure, there is provided an exhaust system for an internal combustion engine comprising an oxygen sensor configured to measure the air-fuel ratio of exhaust gas provided in an exhaust passage of an internal combustion engine and including a diffusion rate limiting layer, and a controller configured to: perform predetermined processing on the basis of a result of comparison between the air-fuel ratio measured by said oxygen sensor and a comparison reference air-fuel ratio, and to correct said comparison reference air-fuel ratio in such a way as to decrease said comparison reference air-fuel ratio by an amount of correction that is made larger when the responsivity of said oxygen sensor to changes in the air-fuel ratio of said internal combustion engine is high than when it is low in the same operation state of said internal combustion engine.

When the predetermined processing using the measured air-fuel ratio is performed, the influence of hydrogen on the oxygen sensor can be reduced also by correcting the comparison reference air-fuel ratio compared with the measured air-fuel ratio instead of correcting the measured air-fuel ratio. Examples of the predetermined processing include feedback control for making the measured air-fuel ratio close to a target air-fuel ratio and abnormality diagnosis of a device that is performed by comparing the measured air-fuel ratio and a threshold value. In these cases, the target air-fuel ratio or the threshold value is said comparison reference air-fuel ratio.

The controller may make the amount of correction larger when the hydrogen concentration in the exhaust gas is high than when it is low.

Since the difference between the measurement value of the oxygen sensor and the actual value increases with increasing hydrogen concentration in the exhaust gas, the air-fuel ratio measured by the oxygen sensor or the comparison reference air-fuel ratio may be corrected accordingly. Thus, the influence of the difference between the measurement value of the oxygen sensor and the actual value ascribable to hydrogen can be reduced.

The controller may make the amount of correction larger when the load of the internal combustion engine is high than when it is low.

The hydrogen concentration in the exhaust gas relates to the load of the internal combustion engine. Specifically, the hydrogen concentration increases with increasing load of the internal combustion engine. Correction based on the load of the internal combustion engine can reduce the influence of the difference between the measurement value of the oxygen sensor and the actual value ascribable to hydrogen. Since the load of the internal combustion engine relates to the air-fuel ratio and the intake air quantity of the internal combustion engine, the correction amount may be varied on the basis of the air-fuel ratio and the intake air quantity of the internal combustion engine.

The controller may make the amount of correction larger when the temperature of the exhaust gas of the internal combustion engine is low than when it is high.

The hydrogen concentration in the exhaust gas relates to the temperature of the exhaust gas. Specifically, the hydrogen concentration in the exhaust gas increases with decreasing temperature of the exhaust gas. Correction based on the temperature of the exhaust gas of the internal combustion engine can reduce the influence of the difference between the measurement value of the oxygen sensor and the actual value ascribable to hydrogen. When the temperature of the exhaust gas is higher than a certain temperature, hydrogen scarcely exists in the exhaust gas. Then, the amount of correction may be made equal to zero.

Advantageous Effects

The present disclosure enables reduction of the influence of the hydrogen-ascribable difference between the measurement value of the oxygen sensor and the actual value.

DESCRIPTION OF EMBODIMENT

In the following, a specific embodiment of the present disclosure will be described with reference to the drawings. The dimensions, materials, shapes, relative arrangements, and other features of the components that will be described in connection with the embodiment are not intended to limit the technical scope of the present disclosure only to them, unless otherwise stated.

Embodiment

Figure 1:
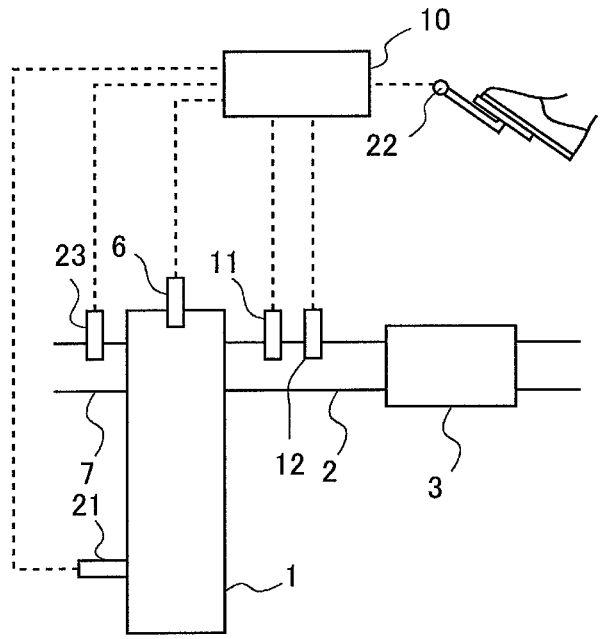
FIG. 1 is a diagram showing the general configuration of an internal combustion engine according to an embodiment and its air-intake and exhaust systems.

FIG. 1 is a diagram showing the general configuration of an internal combustion engine 1 according to an embodiment and its air-intake and exhaust systems. The internal combustion engine 1 is one for driving a vehicle. The internal combustion engine 1 may be either a diesel engine or a gasoline engine. The internal combustion engine 1 is connected with an exhaust passage 2. The exhaust passage 2 is provided with a catalyst 3. The catalyst 3 is not an essential component in this embodiment.

The exhaust passage 2 is further provided with an air-fuel ratio sensor 11 and a temperature sensor 12 at locations upstream of the catalyst 3. The air-fuel ratio sensor 11 measures the air-fuel ratio of the exhaust gas flowing into the catalyst 3, and the temperature sensor 12 measures the temperature of the exhaust gas flowing into the catalyst 3. The internal combustion engine 1 is provided with fuel injection valves 6 that inject fuel into respective cylinders. The air-fuel ratio sensor 11 is, for example, a limiting current oxygen sensor, which generates an output substantially proportional to the air-fuel ratio over a wide air-fuel ratio range. The air-fuel ratio sensor 11 is not limited to a limiting current oxygen sensor, but it may be an electromotive force oxygen sensor (i.e. concentration cell oxygen sensor). In this embodiment, the air-fuel ratio sensor 11 corresponds to the oxygen sensor according to the present disclosure.

The internal combustion engine 1 is also connected with an intake passage 7. The intake passage 7 is provided with an air flow meter 23, which measures the intake air quantity of the internal combustion engine 1.

An ECU 10 is provided as a controller for the internal combustion engine 1. The ECU 10 is an electronic controller. The ECU 10 controls the internal combustion engine 1 and other components such as an exhaust gas purification apparatus. The ECU 10 is electrically connected with the aforementioned sensors, a crank position sensor 21, and an accelerator opening degree sensor 22. The output values of these sensors are input to the ECU 10.

The ECU 10 is capable of recognizing the operation state of the internal combustion engine 1. Specifically, the ECU 10 can calculate the engine speed on the basis of measurement by the crank position sensor 21 and the engine load on the basis of measurement by the accelerator opening degree sensor 22. The ECU 10 can also calculate the flow rate of the exhaust gas from the measurement value of the air flow meter 23 and the fuel injection quantity through the fuel injection valve 6. The ECU 10 is connected with the fuel injection valve 6 by electrical wiring to control the fuel injection valve 6.

The ECU 10 performs predetermined processing on the basis of the result of comparison of the air-fuel ratio measured by the air-fuel ratio sensor 11 (measured air-fuel ratio) and a comparison reference air-fuel ratio. For example, the ECU 10 performs feedback control of the fuel injection quantity through the fuel injection valve 6 so as to make the measured air-fuel ratio equal to a target air-fuel ratio. Alternatively, the ECU 10 performs abnormality diagnosis of the fuel injection valve 6 by comparing the measured air-fuel ratio and a threshold. In this embodiment, the ECU 10 functions as the controller according to the present disclosure in performing the such predetermined processing.

Figure 2:
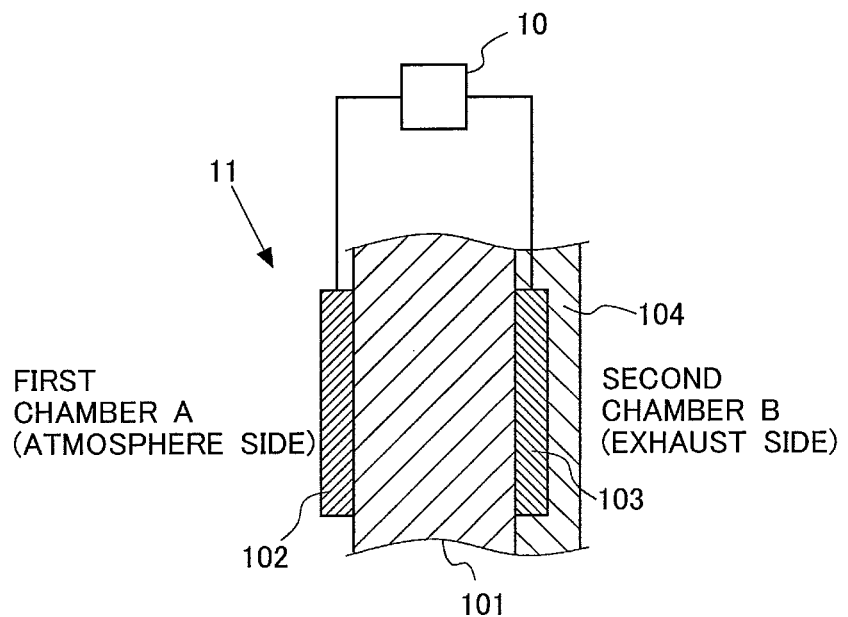
FIG. 2 is a diagram showing the cross sectional structure of a relevant portion of a sensor element of an air-fuel ratio sensor.

FIG. 2 is a diagram showing the cross sectional structure of a relevant portion of a sensor element of the air-fuel ratio sensor 11. The air-fuel ratio sensor 11 has a solid electrolyte layer 101, which separates a first chamber A communicating with the atmosphere and a second chamber B communicating with the interior of the exhaust passage 2. The solid electrolyte layer 101 is made of a porous insulating material such as zirconia ($Zr_2O_3$). The air-fuel ratio sensor 11 further has a first chamber side electrode 102 made of platinum provided on the first-chamber-side surface of the solid electrolyte layer 101 and a second chamber side electrode 103 made of platinum provided on the second-chamber-side surface of the solid electrolyte layer 101. The surface of the second chamber side electrode 103 is covered with a diffusion rate limiting layer 104, and a portion of the exhaust gas flowing in the exhaust passage 2 passes through the diffusion rate limiting layer 104 to reach the second chamber side electrode 103.

If a certain voltage is applied between the first chamber side electrode 102 and the second chamber side electrode 103 of the above-described air-fuel ratio sensor 11 by the ECU 10, an electrical current relating to the oxygen concentration in the exhaust gas flows in the air-fuel ratio sensor 11. Since this current relates to the air-fuel ratio, the air-fuel ratio sensor 11 measures the air-fuel ratio on the basis of this current.

When the air-fuel ratio of the exhaust gas is a lean air-fuel ratio higher than the theoretical air-fuel ratio, oxygen remaining in the exhaust gas without having reacted with fuel is ionized by reception of electrons through the electrode reaction on the second chamber side electrode 103. The oxygen ions thus produced travel through the solid electrolyte layer 101 from the second chamber side electrode 103 toward the first chamber side electrode 102. When the oxygen ions reach the first chamber side electrode 102, they are deprived of electrons to become oxygen again and discharged to the first chamber A. This travel of oxygen ions produces an electrical current flowing in the direction from the first chamber side electrode 102 toward the second chamber side electrode 103.

On the other hand, when the air-fuel ratio of the exhaust gas is a rich air-fuel ratio lower than the theoretical air-fuel ratio, oxygen in the first chamber A is ionized by reception of electrons through the electrode reaction on the first chamber side electrode 102, in contrast to the above-described case where the air-fuel ration is a lean air fuel ratio. The oxygen ions thus produced travel through the solid electrolyte layer 101 from the first chamber side electrode 102 toward the second chamber side electrode 103 and thereafter undergo catalyzed reaction with combustible components (e.g. $H_2$, CO, and HC) in the exhaust gas diffused in the diffusion rate limiting layer 104 to produce $CO_2$ and $H_2O$. This travel of oxygen produces an electrical current flowing in the direction from the second chamber side electrode 103 toward the first chamber side electrode 102.

Measurement of air-fuel ratio with the air-fuel ratio sensor 11 configured as above involves a measurement error ascribable to hydrogen in the exhaust gas. Since the molecular weight of hydrogen is smaller than the other molecules, such as oxygen, contained in the exhaust gas, hydrogen has higher diffusion speed in the diffusion rate limiting layer 104 and travels through the diffusion rate limiting layer 104 more easily. Hence, as the exhaust gas passes through the diffusion rate limiting layer 104, while the hydrogen concentration decreases to a relatively small degree, the concentrations of the other molecules decrease greatly. Consequently, the hydrogen concentration relative to the concentrations of the other molecules becomes higher in the vicinity of the second chamber side electrode 103 than in the actual exhaust gas (that is, the exhaust gas before its entrance into the air-fuel ratio sensor 11). For this reason, the measured air-fuel ratio is lower than the actual air-fuel ratio. More specifically, the higher the hydrogen concentration in the exhaust gas is, the larger the shortfall of the measured air-fuel ratio from the actual air-fuel ratio is. Therefore, the ECU 10 is configured to make a correction to the measured air-fuel ratio based on the hydrogen concentration.

Figure 3:
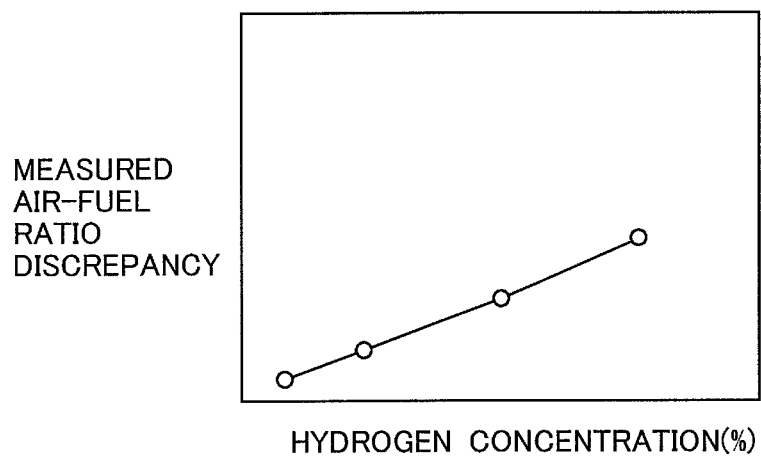
FIG. 3 is a graph showing the relationship between the hydrogen concentration in the actual exhaust gas and the discrepancy of the air-fuel ratio measured by the air-fuel ratio sensor from the actual air-fuel ratio (the measured air-fuel ratio discrepancy).

FIG. 3 is a graph showing the relationship between the hydrogen concentration in the actual exhaust gas and the discrepancy of the air-fuel ratio measured by the air-fuel ratio sensor 11 from the actual air-fuel ratio. This discrepancy will also be referred to as the "measured air-fuel ratio discrepancy" hereinafter. The measured air-fuel ratio discrepancy is shown as the actual air-fuel ratio minus the measured air-fuel ratio. Since the measured air-fuel ratio decreases with increasing hydrogen concentration in the exhaust gas, the measured air-fuel ratio discrepancy increases with increasing hydrogen concentration in the exhaust gas. Therefore, in the correction of the measured air-fuel ratio, the measured air-fuel ratio is increased by an amount of correction that is made larger when the hydrogen concentration in the exhaust gas is high than when it is low. This correction can reduce the discrepancy between the actual air-fuel ratio and the measured air fuel ratio.

Even after correction based on the hydrogen concentration in the exhaust gas is made to the measured air-fuel ratio, a discrepancy between the measured air-fuel ratio and the actual air-fuel ratio may still remain in some cases. It was discovered that such a discrepancy relates to the responsivity of the air-fuel ratio sensor 11. The tendency of discrepancy of the measured air-fuel ratio ascribable to hydrogen changes depending on the responsivity of the air-fuel ratio sensor 11. The responsivity of the air-fuel ratio sensor 11 varies due to various factors in the course of use of the air-fuel ratio sensor 11 aside from an individual difference. For example, the speed of diffusion of gases in the diffusion rate limiting layer 104 may change due to time-dependent deterioration of the diffusion rate limiting layer 104 and/or clogging of the diffusion rate limiting layer 104 with soot.

Hence, the quantity of hydrogen that reaches the second chamber side electrode 103 may also change with the lapse of time. Then, a discrepancy between the actual air-fuel ratio and the measured air-fuel ratio will still remain even after correction based on the hydrogen concentration in the exhaust gas is made to the air-fuel ratio measured by the air-fuel ratio sensor 11, because the relationship between the hydrogen concentration in the exhaust gas and the measured air-fuel ratio discrepancy shown in FIG. 3 changes depending on the speed of diffusion of hydrogen. Therefore, the ECU 10 is configured to correct the measured air-fuel ratio further taking account of the responsivity of the air-fuel ratio sensor 11.

Figure 4:
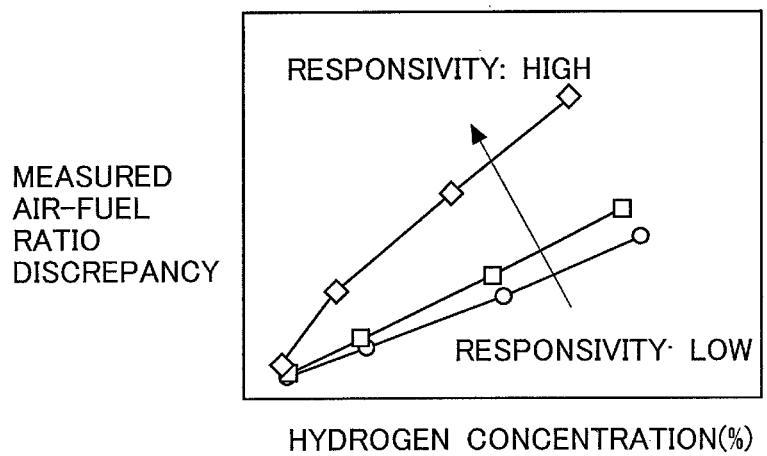
FIG. 4 is a graph showing the relationship between the hydrogen concentration in the actual exhaust gas and the discrepancy of the air-fuel ratio measured by the air-fuel ratio sensor (the measured air-fuel ratio discrepancy) for different responsivities of the air-fuel ratio sensor.

FIG. 4 is a graph showing the relationship between the hydrogen concentration in the actual exhaust gas and the discrepancy of the air-fuel ratio measured by the air-fuel ratio sensor 11 (the measured air-fuel ratio discrepancy) for different responsivities of the air-fuel ratio sensor 11. At the same hydrogen concentration, the higher the responsivity of the air-fuel ratio sensor 11 is, the larger the measured air-fuel ratio discrepancy is. If the responsivity of the air-fuel ratio sensor 11 is the same, the higher the hydrogen concentration in the exhaust gas is, the larger the measured air-fuel ratio discrepancy is. The relationship shown in FIG. 4 can be determined by experiment, simulation or other methods.

Now, how to determine the responsivity of the air-fuel ratio sensor 11 will be described. The responsivity of the air-fuel ratio sensor 11 indicates how fast the measured air-fuel ratio changes after changes in the actual air-fuel ratio. The responsivity of the air-fuel ratio sensor 11 is considered to be inversely proportional to the time constant of the measured air-fuel ratio in changes in the measured air-fuel ratio with the air-fuel ratio sensor 11. Alternatively, the amount of change in the measured air-fuel ratio per unit time may be employed as the responsivity. The time constant in changes in the measured air-fuel ratio is defined as the time taken for the measured air-fuel ratio reaches to e.g. 63.2% of the final value of the measured air-fuel ratio. Hence, the ECU 10 retains the values of the measured air-fuel ratio through its changes at all times. In the case where the measured air-fuel ratio increases, the ECU 10 calculates the amount of change in the measured air-fuel ratio over the period from the start to end of the increase of the measured air-fuel ratio and then calculates a time constant as the time taken for the measured air-fuel ratio to reach the value corresponding to e.g. 63.2% of that amount of change since the start of the increase of the measured air-fuel ratio. Likewise, in the case where the measured air-fuel ratio decreases, the ECU 10 calculates the amount of change in the measured air-fuel ratio over the period from the start to end of the decrease of the measured air-fuel ratio and then calculates a time constant as the time taken for the measured air-fuel ratio to reach the value corresponding to e.g. 63.2% of that amount of change since the start of the decrease of the measured air-fuel ratio.

A value inversely proportional to a time constant that is calculated in one occasion of increase or decrease of the measured air-fuel ratio may be employed as the responsivity, but this value can be greatly affected by disturbance. Hence, time constants may be calculated at multiple (e.g. two or three) occasions of increase or decrease of the measured air-fuel ratio, and a value inversely proportional to the average of them may be employed as the responsivity.

To calculate the responsivity of the air-fuel ratio sensor 11, it is necessary that the measured air-fuel ratio changes. The change of the measured air-fuel ratio through which the responsivity is calculated may be either a change of the measured air-fuel ratio that occurs naturally or a change of the measured air-fuel ratio resulting from control of the air-fuel ratio that is performed by the ECU 10 for the purpose of calculating the responsivity of the air-fuel ratio sensor 11. Alternatively, the change of the measured air-fuel ratio may be a change resulting from control of the air-fuel ratio that is performed by the ECU 10 for the purpose of abnormality diagnosis of the air-fuel ratio sensor 11, the catalyst 3, or other components. The air-fuel ratio changes greatly, for example, when fuel cut is performed upon deceleration or other occasions to stop fuel injection through the fuel injection valve 6. In that case, the time constant of the measured air-fuel ratio can be calculated with high accuracy.

The air-fuel ratio changes greatly also when active control that changes the air-fuel ratio multiple times alternately to a predetermined lean air-fuel ratio higher than the theoretical air-fuel ratio and a predetermined rich air-fuel ratio lower than the theoretical air-fuel ratio is performed. In that case also, the responsivity of the air-fuel ratio sensor 11 can be determined with high accuracy. While the active control may be performed for the purpose of determining the responsivity of the air-fuel ratio sensor 11, the responsivity of the air-fuel ratio sensor 11 may be determined utilizing a change in the measured air-fuel ratio that is caused when the active control is performed for other purposes (e.g. abnormality diagnosis). To calculate the responsivity accurately, it is desirable that the air-fuel ratio change somewhat greatly. Hence, the responsivity may be calculated when the air-fuel ratio changes to an extent large enough to enable accurate calculation of the responsivity.

Calculation of the responsivity is performed when the operation state of the internal combustion engine 1 undergoes a predetermined change. Since the responsivity of the air-fuel ratio sensor 11 is influenced by the operation state of the internal combustion engine 1 such as the air-fuel ratio, the responsivity is calculated on the basis of the measured air-fuel ratio when the operation state of the internal combustion engine 1 changes in the same manner so that the responsivity will not be influenced by the change in the operation state of the internal combustion engine 1. Moreover, a correction may be made to the responsivity that is calculated when the operation state of the internal combustion engine 1 undergoes a change different from the predetermined change to adjust it to the responsivity with the predetermined change of the operation state. The predetermined change may have certain extent of variation. Moreover, several types of predetermined changes may be employed.

Figure 5:
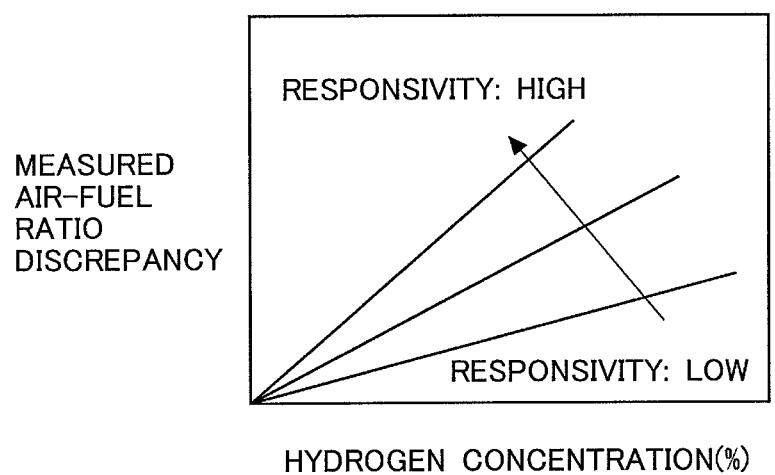
FIG. 5 is a graph showing the relationship between the responsivity, the hydrogen concentration, and the measured air-fuel ratio discrepancy.

As described above, the responsivity of the air-fuel ratio sensor 11 relates to the tendency of discrepancy of the measured air-fuel ratio from the actual air-fuel ratio ascribable to hydrogen. Therefore, in the correction of the measured air-fuel ratio, the responsivity of the air-fuel ratio sensor 11 is taken into account as well as the hydrogen concentration in the exhaust gas. FIG. 5 is a graph showing the relationship between the responsivity, the hydrogen concentration, and the measured air-fuel ratio discrepancy. Here, the relationship between the hydrogen concentration and the measured air-fuel ratio discrepancy is expressed by the linear function "(measured air-fuel ratio discrepancy)= RE·(hydrogen concentration)". RE in the above function is a coefficient that varies depending on the responsivity. More specifically, the higher the responsivity is, the larger the coefficient RE is. The relationship between the responsivity and the coefficient RE is determined in advance by experiment, simulation, or other methods and stored in the ECU 10.

While in FIG. 5 the relationship between the hydrogen concentration and the measured air-fuel ratio discrepancy is represented by simple linear functions, the relationship may be prepared on the basis of relationship determined by experiment or other methods like those shown in FIG. 4 alternatively.

The measured air-fuel ratio discrepancy calculated as above is used as a correction value for the measured air-fuel ratio. Specifically, the measured air-fuel ratio discrepancy is added to the measured air-fuel ratio to correct the measured air-fuel ratio. The correction to the measured air-fuel ratio is performed when hydrogen is supposed to be produced. While a correction value to be added to the measured air-fuel ratio for correction of the measured air-fuel ratio is calculated in the above-described case, a correction coefficient to multiply the measured air-fuel ratio for correction of the measured air-fuel ratio may be calculated alternatively.

Figure 6:
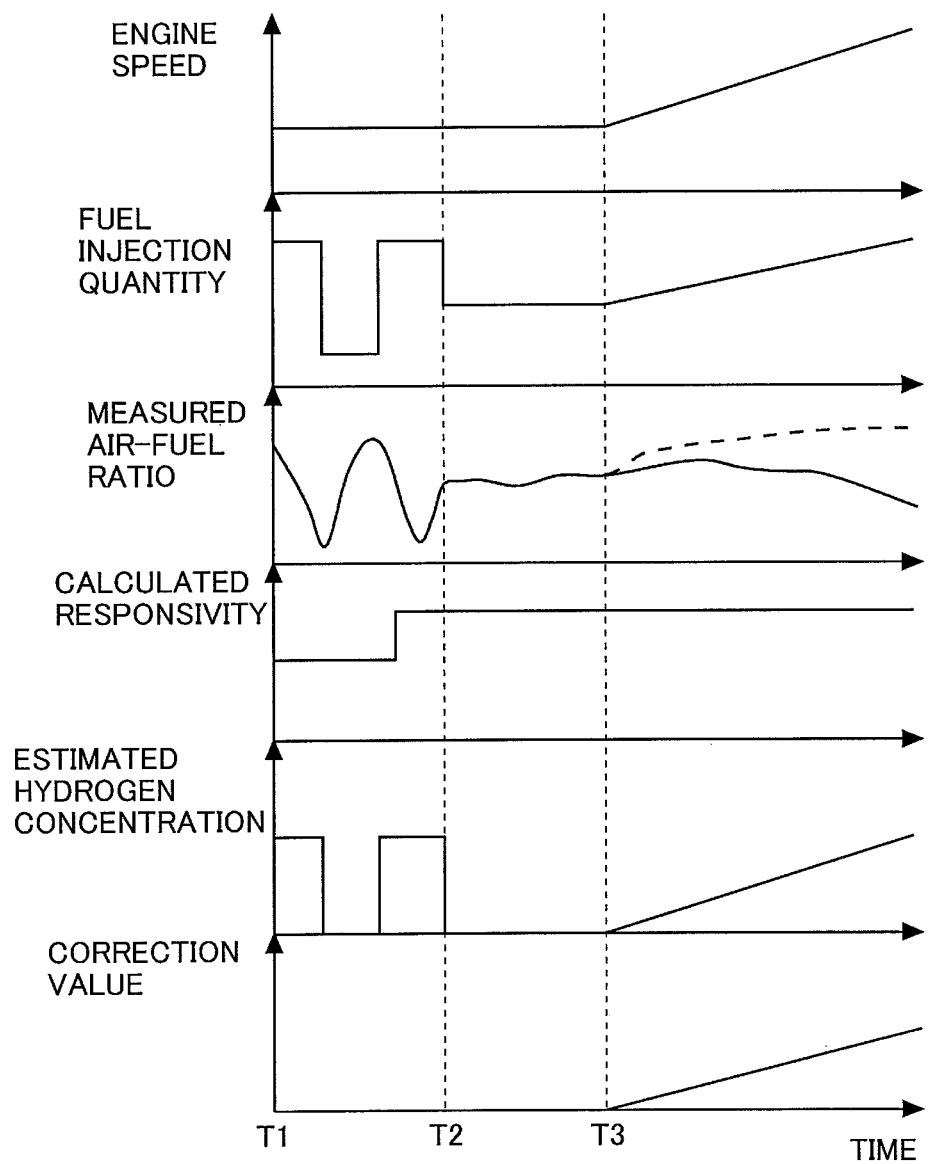
FIG. 6 is a time chart showing how the values of the various quantities change with time in a case where the measured air-fuel ratio is corrected.

FIG. 6 is a time chart showing how the values of the various quantities change with time in a case where the measured air-fuel ratio is corrected. FIG. 6 shows, in order from top to bottom, the changes with time of the engine speed, the fuel injection quantity through the fuel injection valve 6, the measured air-fuel ratio, the calculated value of the responsivity of the air-fuel ratio sensor 11, the estimated hydrogen concentration in the exhaust gas, and the correction value for the measured air-fuel ratio. The broken line in the graph of the measured air-fuel ratio represents the measured air-fuel ratio after correction, and the solid line in the graph of the measured air-fuel ratio represents the measured air-fuel ratio before correction.

Active control is performed during the period from T1 to T2, during which the fuel injection quantity is increased and decreased periodically. This causes the measured air-fuel ratio to fluctuate. The responsivity of the air-fuel ratio sensor 11 is calculated on the basis of the measured air-fuel ratios during this period.

Since the hydrogen concentration in the exhaust gas relates to the load of the internal combustion engine 1, the hydrogen concentration in the exhaust gas can be estimated on the basis of the load of the internal combustion engine 1. Specifically, the relationship between the load of the internal combustion engine 1 and the hydrogen concentration in the exhaust gas may be determined by experiment, simulation or other methods beforehand and stored in the ECU 10. Then, the hydrogen concentration in the exhaust gas can be estimated on the basis of the load of the internal combustion engine 1. The hydrogen concentration in the exhaust gas can also be estimated on the basis of other parameters. For example, the intake air quantity and the fuel injection quantity or the intake air quantity and the air-fuel ratio also relate to the hydrogen concentration in the exhaust gas. Furthermore, the higher the exhaust gas temperature is, the more hydrogen and oxygen in the exhaust gas is apt to react. Consequently, as the exhaust gas temperature rises, the quantity of hydrogen decreases, and the hydrogen concentration decreases accordingly. Thus, the exhaust gas temperature also relates to the hydrogen concentration. Therefore, the hydrogen concentration can be estimated on the basis of the exhaust gas temperature. Specifically, the hydrogen concentration is estimated higher when the exhaust gas temperature is low than when it is high. When the exhaust gas temperature is higher than a specific temperature, the hydrogen concentration may be estimated to be zero. This specific temperature is a temperature above which hydrogen no longer exists in the exhaust gas because of progress of the hydrogen-oxygen reaction. The hydrogen concentration in the exhaust gas may be estimated using a two or more of the aforementioned parameters relating to the hydrogen concentration in the exhaust gas in combination. The ECU 10 estimates the hydrogen concentration in this way at all times. The method of determining the hydrogen concentration in the exhaust gas is not limited to the above-described methods, but other methods may be employed. For example, the hydrogen concentration may be measured using a sensor.

As shown in FIG. 5, if the operation state (e.g. the engine speed and engine load) of the internal combustion engine 1 is the same, in other words if the hydrogen concentration is the same, the higher the responsivity is, the larger the measured air-fuel ratio discrepancy is. The ECU 10 reads in the coefficient RE associated with the responsivity calculated in the period from T1 to T2 in FIG. 6 and multiplies the hydrogen concentration estimated after time T2 by the coefficient RE to calculate the measured air-fuel ratio discrepancy as a correction value for the measured air-fuel ratio. Then, the ECU 10 corrects the measured air-fuel ratio by adding the measured air-fuel ratio discrepancy to the measured air-fuel ratio.

During the period from T2 to T3 in FIG. 6, since the estimated value of the hydrogen concentration is 0, the measured air-fuel ratio discrepancy is 0, and the correction value for the measured air-fuel ratio is also 0. As the estimated value of the hydrogen concentration increases with increases in the engine speed and the fuel injection quantity after time T3, the correction value is calculated from the estimated value of the hydrogen concentration and the coefficient RE. Hence, after time T3, the correction value increases in accordance with the estimated value of the hydrogen concentration. The measured air-fuel ratio after correction with this correction value is higher than the measured air-fuel ratio before the correction. Thus, since the measured air-fuel ratio falls short of the actual air-fuel ratio due to influence of hydrogen, the measured air-fuel ratio is increased by correction to eliminate the shortfall.

Figure 7:
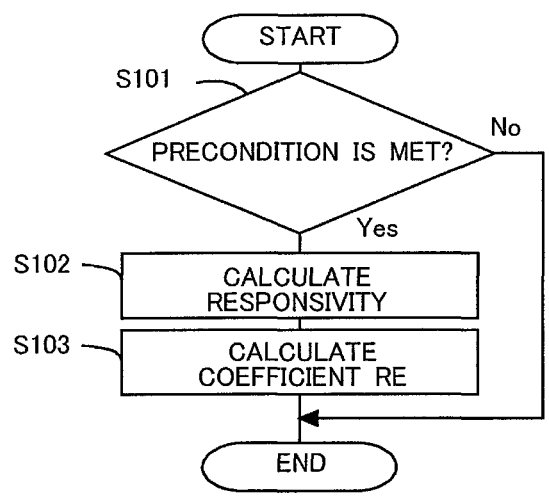
FIG. 7 is a flow chart of a process of calculating the coefficient RE.

FIG. 7 is a flow chart of a process of calculating the coefficient RE. This process is executed by the ECU 10 every predetermined time. Since the responsivity of the air-fuel ratio sensor 11 changes depending on the condition of the diffusion rate limiting layer 104, it is preferred that the coefficient RE be calculated at predetermined time intervals.

In step S101, it is determined whether or not a precondition for calculation of the responsivity is met. If the active control or fuel cut has been started and the operation state of the internal combustion engine 1 has undergone a predetermined change, it is determined that the precondition is met. When the active control or fuel cut has been started, it is possible to calculate the time constant of the air-fuel ratio sensor 11. Therefore, the condition that the active control or fuel cut has been started is set as a part of the precondition. Furthermore, since the calculated value of the responsivity is influenced by the operation state of the internal combustion engine 1, the responsivity is calculated when the operation state of the internal combustion engine 1 has undergone a predetermined change. Thus, the condition that the operation state of the internal combustion engine 1 has undergone a predetermined change is set as a part of the precondition. If an affirmative determination is made in step S101, the process proceeds to step S102. If a negative determination is made in step S101, this process is terminated.

In step S102, the responsivity of the air-fuel ratio sensor 11 is calculated. Then, in step S103, the coefficient RE is calculated. The relationship between the responsivity of the air-fuel ratio sensor 11 and the coefficient RE is stored in the ECU 10 in advance. The coefficient RE determined in step S103 is saved in the ECU as the coefficient RE to multiply the hydrogen concentration to calculate a correction value for the measured air-fuel ratio. In the case where a negative determination is made in step S101, correction of the measured air-fuel ratio is performed using a coefficient RE that has determined previously.

Figure 8:
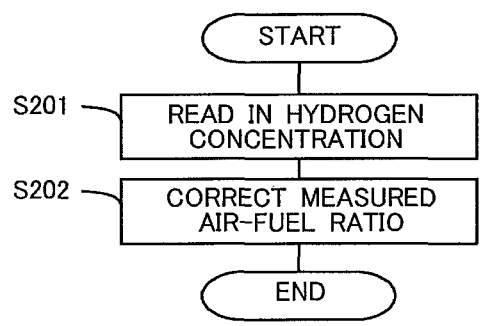
FIG. 8 is a flow chart of a process of correcting the measured air-fuel ratio.

FIG. 8 is a flow chart of a process of correcting the measured air-fuel ratio. This process is executed by the ECU 10 every predetermined time.

In step S201, the hydrogen concentration in the exhaust gas is read in. The ECU 10 is calculating the hydrogen concentration in the exhaust gas at all times using the load of the internal combustion engine 1, the exhaust gas temperature or other parameters, and the thus calculated value is read in this step.

In step S202, correction of the measured air-fuel ratio taking account of the hydrogen concentration is performed. Specifically, the measured air-fuel ratio discrepancy is calculated by multiplying the hydrogen concentration in the exhaust gas read in step S201 by the coefficient RE calculated in step S103, and the measured air-fuel ratio is corrected by adding the measured air-fuel ratio discrepancy thus calculated to the measured air-fuel ratio. In this embodiment, the ECU 10 functions as the controller according to the present disclosure in executing the processing of step S202.

As above, correction of the measured air-fuel ratio is performed on the basis of the responsivity of the air-fuel ratio sensor 11 and the hydrogen concentration in the exhaust gas. This enables determination of the air-fuel ratio with improved accuracy. Therefore, highly-accurate air-fuel ratio control and/or highly-accurate abnormality diagnosis can be performed using the measured air-fuel ratio after the correction.

While correction is made to the measured air-fuel ratio in the above-described case, correction may be made to an air-furl ratio (such as a control target value or threshold) to be compared with the measured air-fuel ratio in certain control using the air-fuel ratio sensor 11, alternatively. For example, in the case where a target air-fuel ratio set in the air-fuel ratio control is to be corrected, the target air-fuel ratio is decreased by an amount of correction that is made larger when the responsivity of the air-fuel ratio sensor 11 is high than when it is low.

In the case where feedback control of the air-fuel ratio is performed, the fuel injection quantity through the fuel injection valve 6 or the intake air quantity is adjusted so as to make the measured air-fuel ratio equal to a target air-fuel ratio. When there is a discrepancy or difference between the measured air-fuel ratio and the actual air-fuel ratio that is ascribable to hydrogen in the exhaust gas, air-fuel ratio control can be performed with improved accuracy by correcting the target air-fuel ratio as well as by correcting the measured air-fuel ratio. Specifically, if the measured air-fuel ratio discrepancy calculated according to FIG. 5 is subtracted from the target air-fuel ratio instead of added to the measured air-fuel ratio, the same amount of adjustment of the fuel injection quantity and the intake air quantity will be given in the feedback control of the air-fuel ratio. Thus, the air-fuel ratio can be adjusted to a desired value similarly.

Figures 9, 10:
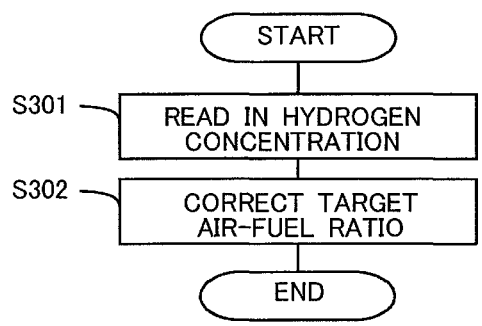
FIG. 9 is a flow chart of a process of correcting a target air-fuel ratio.
FIG. 10 is a table showing target values of the excess air ratio $\lambda$ for different hydrogen concentrations in the exhaust gas and different time constants of the measured air-fuel ratio.

FIG. 9 is a flow chart of a process of correcting the target air-fuel ratio. This process is executed by the ECU 10 every predetermined time.

In step S301, the hydrogen concentration in the exhaust gas is read in. The ECU 10 is calculating the hydrogen concentration in the exhaust gas at all times, and the thus calculated value is read in this step.

In step S302, correction of the target air-fuel ratio taking account of the hydrogen concentration is performed. Specifically, the measured air-fuel ratio discrepancy is calculated by multiplying the hydrogen concentration in the exhaust gas read in step S201 by the coefficient RE calculated in step S103, and the target air-fuel ratio is corrected by subtracting the measured air-fuel ratio discrepancy thus calculated from the target air-fuel ratio. In this embodiment, the ECU 10 functions as the controller according to the present disclosure in executing the processing of step S302.

FIG. 10 is a table showing target values of the excess air ratio A for different hydrogen concentrations in the exhaust gas and different time constants of the measured air-fuel ratio. The air-fuel ratio (or the fuel injection quantity or the intake air quantity) is adjusted in such a way that the target value of the excess air ratio $\lambda$ is increased with increasing hydrogen concentration in the exhaust gas and decreasing time constant (namely, increasing responsivity of the sensor). Thus, correction may be made to the target value of control instead of the measured air-fuel ratio.

In cases where the measured air-fuel ratio is compared with a threshold value to diagnose abnormality of, for example, the fuel injection valve 6, a sensor, or a component arranged upstream of the air-fuel ratio sensor 11, correction may be made to the threshold value instead of the measured air-fuel ratio. Specifically, the influence of the responsivity of the air-fuel ratio sensor 11 and hydrogen can be reduced by subtracting the measured air-fuel ratio discrepancy calculated according to FIG. 5 from the threshold value instead of adding it to the measured air-fuel ratio. In that case, the threshold value is decreased by an amount of correction that is made larger when the responsivity of the air-fuel ratio sensor 11 is high than when it is low.

In the above-described cases, the hydrogen concentration in the exhaust gas is estimated, and correction of the measured air-fuel ratio or an air-fuel ratio to be compared with the measured air-fuel ratio (i.e. a control target value or threshold value) is performed on the basis of the estimated hydrogen concentration. However, the hydrogen concentration in the exhaust gas is not necessarily required to be estimated directly. For example, correction of the measured air-fuel ratio or correction of an air-fuel ratio to be compared with the measured air-fuel ratio (i.e. a control target value or threshold value) may be performed using a parameter relating to the hydrogen concentration in the exhaust gas. For example, the load of the internal combustion engine 1 relates to the hydrogen concentration in the exhaust gas. Correction of the measured air-fuel ratio may be performed directly on the basis of the load of the internal combustion engine 1. In that case, the relationship between the load of the internal combustion engine 1, the responsivity, and the correction value for the measured air-fuel ratio is determined in advance by experiment, simulation, or other methods.

The intake air quantity and the air-fuel ratio also relate to the hydrogen concentration in the exhaust gas. Hence, correction of the measured air-fuel ratio may be performed directly on the basis of the intake air quantity and the air-fuel ratio. In that case, the relationship between the intake air quantity, the air-fuel ratio, the responsivity of the air-fuel ratio sensor 11, and the correction value for the measured air-fuel ratio is determined in advance by experiment, simulation or other methods. Furthermore, the exhaust gas temperature also relates to the hydrogen concentration in the exhaust gas. Hence, correction of the measured air-fuel ratio may be performed directly on the basis of the exhaust gas temperature. In that case, the correction value or the amount of correction is made larger when the exhaust gas temperature is low than when it is high. In the case where correction is performed in this way, the relationship between the exhaust gas temperature, the responsivity of the air-fuel ratio sensor 11, and the correction value for the measured air-fuel ratio is determined in advance by experiment, simulation or other methods. When the exhaust gas temperature is higher than a specific temperature, the correction amount may be made equal to zero. This specific temperature is a temperature above which hydrogen no longer exists in the exhaust gas because of progress of the hydrogen-oxygen reaction. Correction of the measured air-fuel ratio may be performed directly on the basis of a combination of two or more of the parameters relating to the hydrogen concentration, including the load of the internal combustion engine 1, the intake air quantity, the fuel injection quantity, the air-fuel ratio, and the exhaust gas temperature.

In the above-described case, correction of the measured air-fuel ratio is performed on the basis of the hydrogen concentration in the exhaust gas and the responsivity of the air-fuel ratio sensor 11. Alternatively, correction of the measured air-fuel ratio may be performed without using the hydrogen concentration in the exhaust gas. In that case, correction of the measured air-fuel ratio based on the responsivity of the air-fuel ratio sensor 11 is performed. In the case where the hydrogen concentration in the exhaust gas is not used in correction, it is not necessary to estimate the hydrogen concentration in the exhaust gas. Moreover, since correction does not depend on the hydrogen concentration, correction is performed also when the exhaust gas does not contain hydrogen. For example, the responsivity of the air-fuel ratio sensor 11 is calculated, and a coefficient RE associated with that responsivity is determined. Then, the measured air-fuel ratio discrepancy is calculated on the assumption that the hydrogen concentration in the exhaust gas is a predetermined hydrogen concentration irrespective of the operation state of the internal combustion engine 1, and then correction of the measured air-fuel ratio or an air-fuel ratio to be compared with the measured air-fuel ratio (e.g. a control target value or threshold value) is performed on the basis of the measured air-fuel ratio discrepancy thus calculated. The correction value determined by this method is constant irrespective of the hydrogen concentration in the exhaust gas. In other words, while the correction value changes depending on the responsivity of the air-fuel ratio sensor 11, it does not change depending on the hydrogen concentration in the exhaust gas. The predetermined hydrogen concentration mentioned above may be the average of the hydrogen concentration that varies depending on the operation state of the internal combustion engine 1. Alternatively, the predetermined hydrogen concentration may be a value that is determined so as to achieve favorable emissions. This method makes the processing simple by eliminating need for correction based on the hydrogen concentration. The operation range may be divided into an operation range in which correction using the hydrogen concentration in the exhaust gas is performed and an operation range in which correction not using the hydrogen concentration in the exhaust gas is performed.

In the above-described case, correction of the measured air-fuel ratio is performed directly using the responsivity (which may be replaced by the time constant) of the air-fuel ratio sensor 11. Alternatively, correction of the measured air-fuel ratio may be performed using a parameter relating to the responsivity of the air-fuel ratio sensor 11. As a parameter relating to the responsivity of the air-fuel ratio sensor 11, the difference or ratio between a standard value of the responsivity and a calculated value of the responsivity may be employed. The standard value of the responsivity may be, for example, the responsivity that the air-fuel ratio sensor 11 in a brand-new state is expected to have. Specifically, the responsivities of a plurality of brand-new air-fuel ratio sensors 11 may be determined by experiment, simulation, or other methods, and the average of them may calculated and set as the standard value of the responsivity. The thus-determined standard value of the responsivity is a constant value irrelevant to individual difference of the air-fuel ratio sensor 11. Alternatively, the responsivity may be actually determined at the time when the air-fuel ratio sensor 11 is brand new, and the thus determined responsivity may be set as the standard value of that air-fuel ratio sensor 11. The relationship between the difference or ratio between the standard value of the responsivity and the calculated value of the responsivity, the hydrogen concentration in the exhaust gas, and the correction value for the measured air-fuel ratio is determined in advance by experiment, simulation, or other methods.

As above, the system according to the embodiment can reduce the influence of the discrepancy of the measurement value of the air-fuel ratio sensor 11 ascribable to hydrogen by correcting the measured air-fuel ratio or an air-fuel ratio to be compared with the measured air-fuel ratio (e.g. a control target value or threshold value) on the basis of the responsivity of the air-fuel ratio sensor 11.

The invention claimed is:

1. An exhaust system for an internal combustion engine, comprising:
    an oxygen sensor configured to measure an air-fuel ratio of exhaust gas provided in an exhaust passage of the internal combustion engine and including a diffusion rate limiting layer, wherein a voltage applied to the oxygen sensor results in an amount of electrical current flowing through the oxygen sensor that is related to the air-fuel ratio of the exhaust gas, and wherein the oxygen sensor measures the amount of electrical current; and
    a controller configured to correct the amount of electrical current measured by said oxygen sensor in such a way as to increase the measured electrical current of said oxygen sensor by an amount of correction that is made larger when a responsivity of said oxygen sensor to at least one of an increase or a decrease in the air-fuel ratio of said internal combustion engine is higher than when the responsivity is lower during an operation state of said internal combustion engine when speed of the internal combustion engine is in a steady state and a quantity of fuel being injected into the internal combustion engine is increasing and decreasing periodically.

2. An exhaust system for an internal combustion engine according to claim 1, wherein said controller is further configured to make the amount of correction larger when a hydrogen concentration in the exhaust gas is higher than when the hydrogen concentration is lower.

3. An exhaust system for an internal combustion engine according to claim 1, wherein said controller is further configured to make the amount of correction larger when a load of said internal combustion engine is higher than when the load is lower.

4. An exhaust system for an internal combustion engine according to claim 1, wherein said controller is further configured to make the amount of correction larger when a temperature of the exhaust gas of said internal combustion engine is lower than when the temperature is higher.

5. An exhaust system for an internal combustion engine, comprising:
  an oxygen sensor configured to measure an air-fuel ratio of exhaust gas provided in an exhaust passage of the internal combustion engine and including a diffusion rate limiting layer, wherein a voltage applied to the oxygen sensor results in an amount of electrical current flowing through the oxygen sensor that is related to the air-fuel ratio of the exhaust gas; and
  a controller configured to:
  perform predetermined processing on the basis of a result of comparison between the air-fuel ratio measured by said oxygen sensor and a comparison reference air-fuel ratio; and
  correct said comparison reference air-fuel ratio in such a way as to decrease said comparison reference air-fuel ratio by an amount of correction that is made larger when a responsivity of said oxygen sensor to at least one of an increase or a decrease in the air-fuel ratio of said internal combustion engine is higher than when the responsivity is lower during an operation state of said internal combustion engine when speed of the internal combustion engine is in a steady state and a quantity of fuel being injected into the internal combustion engine is increasing and decreasing periodically.

6. An exhaust system for an internal combustion engine according to claim 5, wherein said controller is further configured to make the amount of correction larger when a hydrogen concentration in the exhaust gas is higher than when the hydrogen concentration is lower.

7. An exhaust system for an internal combustion engine according to claim 5, wherein said controller is further configured to make the amount of correction larger when a load of said internal combustion engine is higher than when the load is lower.

8. An exhaust system for an internal combustion engine according to claim 5, wherein said controller is further configured to make the amount of correction larger when a temperature of the exhaust gas of said internal combustion engine is lower than when the temperature is higher.

* * * * *